(12) United States Patent
Aizawa

(10) Patent No.: US 8,863,600 B2
(45) Date of Patent: Oct. 21, 2014

(54) RACK AND PINION STEERING DEVICE

(75) Inventor: Toshiyuki Aizawa, Maebashi (JP)

(73) Assignee: NSK Ltd., Tokyo (JP)

( * ) Notice: Subject to any disclaimer, the term of this patent is extended or adjusted under 35 U.S.C. 154(b) by 120 days.

(21) Appl. No.: 13/354,936

(22) Filed: Jan. 20, 2012

(65) Prior Publication Data

US 2012/0186371 A1    Jul. 26, 2012

(30) Foreign Application Priority Data

Jan. 21, 2011 (JP) ................... 2011-010691
Oct. 24, 2011 (JP) ................... 2011-232525

(51) Int. Cl.
| | | |
|---|---|---|
| F16H 1/04 | (2006.01) | |
| F16H 35/00 | (2006.01) | |
| B62D 3/12 | (2006.01) | |
| F16H 19/04 | (2006.01) | |
| F16H 57/00 | (2012.01) | |

(52) U.S. Cl.
CPC . *B62D 3/12* (2013.01); *F16H 19/04* (2013.01); *F16H 2057/0081* (2013.01)
USPC .................... 74/422; 74/388 PS; 180/444

(58) Field of Classification Search
USPC ............... 74/388 PS, 422, 89.16, 89.17, 462; 180/444; 280/777, 93.514
See application file for complete search history.

(56) References Cited

U.S. PATENT DOCUMENTS

| | | | | |
|---|---|---|---|---|
| 3,680,443 A | * | 8/1972 | Jenvey | 91/375 A |
| 3,745,850 A | * | 7/1973 | Bayle | 74/422 |
| 4,224,833 A | * | 9/1980 | Jablonsky | 74/422 |
| 4,263,816 A | * | 4/1981 | Adams | 74/411 |
| 4,996,905 A | * | 3/1991 | Borror | 91/375 A |
| 5,429,202 A | * | 7/1995 | Millard et al. | 180/400 |
| 6,826,945 B1 | * | 12/2004 | Breitweg et al. | 72/406 |
| 6,860,829 B2 | * | 3/2005 | Bock et al. | 475/18 |
| 2005/0039560 A1 | * | 2/2005 | Degorce et al. | 74/422 |
| 2005/0257634 A1 | * | 11/2005 | Someya et al. | 74/409 |
| 2006/0005652 A1 | * | 1/2006 | Kurokawa et al. | 74/425 |

* cited by examiner

*Primary Examiner* — Troy Chambers
*Assistant Examiner* — Emily Cheng
(74) *Attorney, Agent, or Firm* — Crowell & Moring LLP

(57) ABSTRACT

A rack and pinion steering device which can restrict a pinion shaft from moving in an axial direction even when a snap ring of supporting a thrust load of the pinion shaft is detached or broken, and in which when the snap ring is detached or broken, the pinion shaft is moved to an upper side in the axial direction. Then, a raised portion of the pinion on a side of a lower end face is brought into contact with an outer peripheral face of a rack. The pinion shaft does not move further in the axial direction. Therefore, the thrust load can be supported, and a predetermined performance of the rack and pinion steering device can be maintained.

1 Claim, 12 Drawing Sheets

PRIOR ART

PRIOR ART

RACK AND PINION STEERING DEVICE

BACKGROUND

The present invention relates to a steering device, particularly relates to a rack and pinion steering device which transmits a steering force exerted to a steering wheel to a side of a wheel by way of a rack that is brought in mesh with a pinion.

There is a rack and pinion steering device which transmits a steering torque of a steering wheel to a side of a wheel by way of a rack that is brought in mesh with a pinion. Further, there is a rack and pinion steering device which has a steering force assisting device (electric power steering device) which makes manipulation of a steering wheel easy by detecting a steering torque of the steering wheel, assisting a steering force exerted to the steering wheel, and transmitting the steering force to a side of a wheel by way of a rack that is brought in mesh with a pinion. As such steering devices, there are rack and pinion steering devices which are disclosed in Japanese Unexamined Patent Publication No. 2010-038254 and Japanese Unexamined Patent Publication No. 2010-031915.

FIG. 10 is a perspective view showing a total of a rack and pinion steering device in a related art, FIG. 11 is a front view of a pinion shaft of FIG. 10, and FIG. 12 is a perspective view indicating a load which is applied to the pinion shaft of FIG. 10. As shown by FIG. 10 and FIG. 11, a pinion shaft 1 is configured with a pinion 4 downward from substantially a middle position in an axial direction thereof, and configured with a large diameter shaft portion 11 a diameter of which is larger than a gear tooth root circle diameter D1 of the pinion at an upper end of the pinion 4. Further, a lower end of the pinion 4 is configured with a small diameter shaft portion 12 a diameter of which is smaller than the gear tooth root circle diameter D1 of the pinion 4.

The large diameter shaft portion 11 is axially supported at a housing 3 by a ball bearing (first bearing) 21. A calk ring 22 is calked to be mounted to a ring-like groove 13 at an upper end of the large diameter shaft portion 11. An inner ring of the ball bearing 21 is squeezed between the calk ring 22 and an upper end face 41 of the pinion 4.

Further, an outer ring of the ball bearing 21 is inserted to a bearing hole 31 which is configured at the housing 3, and is fixed to the housing 3 unmovably in an axial direction by a snap ring 23 which is mounted to a ring-like groove 32 on a side of an opening of the bearing hole 31.

A gear tooth root 43 of the pinion 4 is piercingly machined with the gear tooth root circle diameter D1 staying as it is on a side of a lower end face 42 (small diameter shaft portion 12) of the pinion 4. Further, the gear tooth root 43 on a side of the upper end face 41 (large diameter shaft portion 11) of the pinion 4 is configured with a raised portion (first raised portion) 44 (a relief portion of a hob cutter in machining a tooth shape of the pinion 4) which has a radius R1 the same as a radius of curvature of the hob cutter on a side downward from the upper end face 41. Therefore, a distal end of the raised portion 44 is configured by a diameter the same as a gear tooth tip circle diameter D2 of the pinion 4.

A dimension of an outer diameter of the small diameter shaft portion 12 is configured to be smaller than the gear tooth root circle diameter D1 of the pinion 4 in order to avoid an interference between the hob cutter and an outer periphery of the small diameter shaft portion 12 when the pinion 4 is piercingly machined by the hob cutter in machining the tooth shape of the pinion 4. The small diameter shaft portion 12 is axially supported at a bearing hole 33 which is configured on a lower side of the housing 3 by means of a needle bearing (second bearing) 24. In this way, the pinion shaft 1 is supported at the housing 3 in a thrust direction and in a radial direction by the ball bearing 21 and the needle bearing 24.

An upper end of the pinion shaft 1 is connected to a steering wheel by way of a steering shaft, not illustrated. When the steering wheel is manipulated, a steering force thereof is transmitted to the pinion shaft 1. Rotation of the pinion shaft 1 is transmitted to a rack 5 by way of the pinion 4, and changes a direction of a steered wheel by way of a tie rod, not illustrated, which is connected to the rack 5. In order to smoothly transmit the rotation of the pinion 4 to the rack 5, teeth of the pinion 4 are configured by those of a helical pinion which has an angle of torsion relative to an axial center of the pinion shaft 1.

A rack guide 6 always presses a press block 61 to a back face of the rack 5 by an adjust cover 62. The adjust cover 62 presses the press block 61 to the back face of the rack 5 by urging the press block 61 by way of a coil spring 63. Thereby, there is eliminated a backlash of a portion at which the pinion 4 and the rack 5 are brought in mesh with each other to thereby smoothly move the rack 5.

As shown by FIG. 12, when a steering force of a steering wheel is transmitted to the rack 5, the pinion 4 is exerted with three kinds of loads of a thrust load P1, a radial load P2, and a tangential load P3.

The radial load P2 and the tangential load P3 are supported by the ball bearing 21 and the needle bearing 24, and the housing 3. However, the thrust load P1 is supported only by the ball bearing 21 and the snap ring 23. Therefore, when the large thrust load P1 is operated and the snap ring 23 is detached or broken, the pinion shaft 1 is moved in the axial direction, and therefore, the thrust load cannot be supported. Particularly, it is difficult to apply the configuration to a high output type of a column assist type electric power steering device or the like.

The rack and pinion steering device of Japanese Unexamined Patent Publication No. 2010-038254 prevents emittance of strange sound between a ball bearing and a snap ring, and does not prevent a movement in an axial direction of a pinion shaft by detachment or breakage of the snap ring. According to the rack and pinion steering device of Japanese Unexamined Patent Publication No. 2010-031915, a groove is configured at an outer ring of a ball bearing as a stopper against loosening of a screw cover which supports a thrust load of a ball bearing. However, the shape of the outer ring of the ball bearing becomes a special shape. Therefore, the manufacturing cost of the ball bearing is increased.

SUMMARY

The present invention provides a rack and pinion steering device which can restrict a pinion shaft from being moved in an axial direction even when a snap ring which supports a thrust load of the pinion shaft is detached or broken.

According to a first aspect of the present invention, there is provided a rack and pinion steering device having a housing, a pinion shaft which is axially supported rotatably by the housing, and to one end of which a steering force of a steering wheel is transmitted, a pinion which is configured at other end of the pinion shaft, a rack which is brought in mesh with the pinion for transmitting the steering force to a side of a wheel, a large diameter shaft portion which is configured at one end of the pinion with a diameter thereof larger than a gear tooth root circle diameter of the pinion, a first bearing which axially supports the large diameter shaft portion rotatably at the housing, a small diameter shaft portion which is configured at other end of the pinion with a diameter thereof smaller than the gear tooth root circle diameter of the pinion, a second bearing which axially supports the small diameter shaft portion rotating at the housing, a first raised portion which is configured at a gear tooth root of the pinion on a side of the large diameter shaft portion, and a second raised portion which is configured at the gear tooth root of the pinion on a side of the small diameter shaft portion.

According to a second aspect of the present invention, there is provided the rack and pinion steering device according to the first aspect of the present invention, in which distal ends of the first raised portion and the second raised portion are configured by diameters the same as a gear tooth tip circle diameter of the pinion.

According to a third aspect of the present invention, there is provided the rack and pinion steering device according to the first aspect of the present invention, in which a distal end of the first raised portion is configured by a diameter the same as a gear tooth tip circle diameter of the pinion, and in which a distal end of the second raised portion is configured by a diameter smaller than the gear tooth tip circle diameter of the pinion and larger than a gear tooth tip of the rack.

According to a fourth aspect of the present invention, there is provided the rack and pinion steering device according to either of the second aspect and the third aspect of the present invention, in which the pinion shaft is moved to a side of the first bearing by a thrust load applied to the pinion, and in which a length in an axial direction until an outer peripheral face of the rack is brought into contact with the second raised portion is configured to be smaller than a length in the axial direction by which the second bearing axially supports the small diameter shaft portion.

The rack and pinion steering device according to the aspects of the present invention is configured by the large diameter shaft portion which is configured at the one end of the pinion with the diameter larger than the gear tooth root circle diameter of the pinion, the first bearing which axially supports rotatably the large diameter shaft portion at the housing, the small diameter shaft portion which is configured at the other end of the pinion with the diameter smaller than the gear tooth root circle diameter of the pinion, the second bearing which axially supports the small diameter shaft portion rotatably at the housing, the first raised portion which is configured at the gear tooth root of the pinion on the side of the large diameter shaft portion, and the second raised portion which is configured at the gear tooth root of the pinion on the side of the small diameter shaft portion.

Therefore, when the large thrust load is applied to the pinion, and a snap ring is detached or broken, the pinion is moved in the axial direction. Then, the second raised portion which is configured at the gear tooth root of the pinion on the side of the small diameter shaft portion is brought into contact with the outer peripheral face of the rack, and the pinion does not move further in the axial direction. Therefore, the thrust load can be supported, and a predetermined performance of the rack and pinion steering device can be maintained.

DESCRIPTION

An explanation will be given of a first embodiment through a third embodiment of the present invention in reference to the drawings as follows.

First Embodiment

Figure 1:
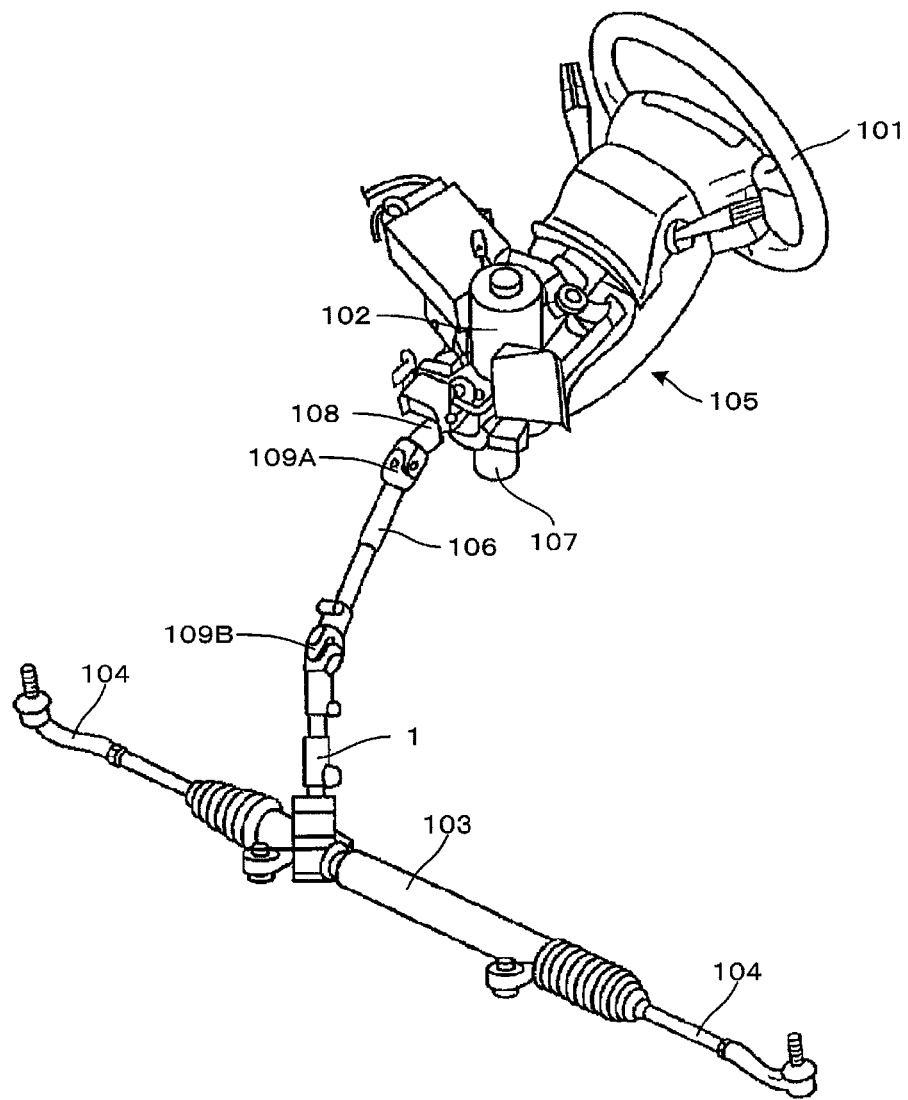
FIG. 1 is a perspective view showing a total of a rack and pinion steering device according to the present invention.
Figure 2:
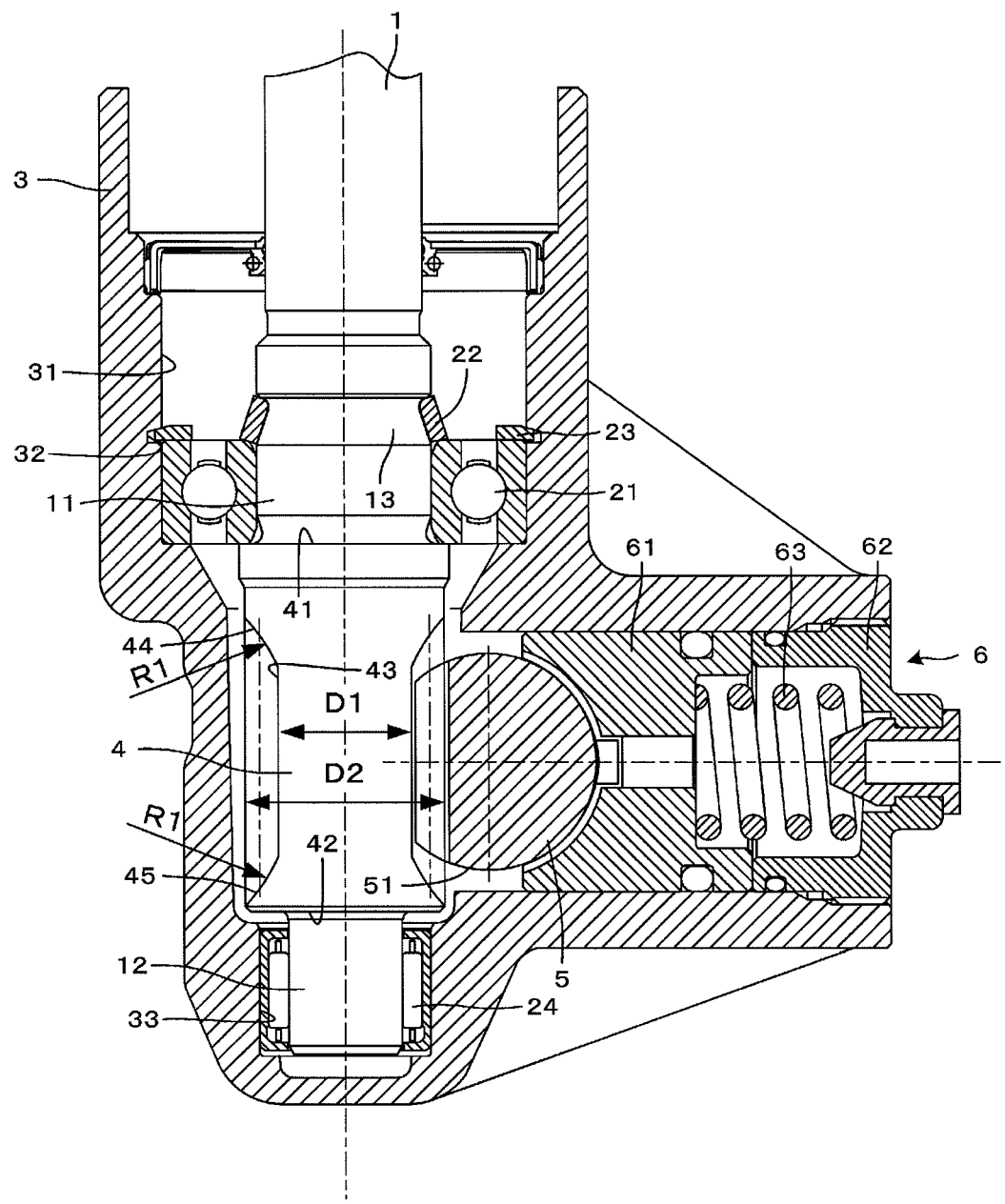
FIG. 2 is a vertical sectional view showing a rack and pinion steering device according to a first embodiment of the present invention.
Figure 3:
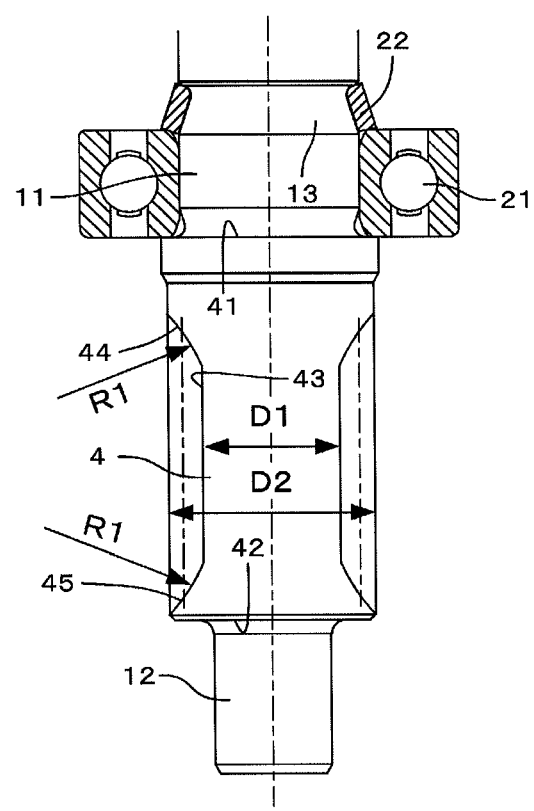
FIG. 3 is a front view of a pinion shaft of FIG. 2.

FIG. 1 is a perspective view showing a total of a rack and pinion steering device according to the present invention, FIG. 2 is a vertical sectional view showing a rack and pinion steering device according to a first embodiment of the present invention, and FIG. 3 is a front view of a pinion shaft of FIG. 2.

As shown in FIG. 1, a rack and pinion steering device of the present invention is a column assist type rack and pinion power steering device. This is a power steering device of a type of steering a steered wheel by way of a tie rod 104 by reciprocally moving a rack of a steering gear 103 of a rack and pinion type by way of a middle shaft 106 by exerting a steering assist force of a motor 102 attached to a middle portion of a column 105 to a steering shaft in order to alleviate a manipulating force of a steering wheel 101.

An output shaft 108 is projected from an end face on a vehicle body front side of an assist device (steering assist portion) 107 for adding an assist torque to the steering shaft. The output shaft 108 is connected to a rear end portion of the middle shaft 106 by way of a universal joint (upper side universal joint) 109A. Further, a front end portion of the middle shaft 106 is connected with a pinion shaft 1 of the steering gear 103 by way of other universal joint (lower side universal joint) 109B.

As shown by FIG. 2 and FIG. 3, there is configured a pinion shaft 4 at the pinion shaft 1 which has been explained in reference to FIG. 1 downward from substantially a middle position in an axial direction thereof. An upper end of the pinion 4 is configured with a large diameter shaft portion 11 a diameter of which is larger than a gear tooth root circle diameter D1 of the pinion 4. Further, a lower end of the pinion 4 is configured with a small diameter shaft portion 12 a diameter of which is smaller than the gear tooth root circle diameter D1 of the pinion 4.

The large diameter shaft portion 11 is axially supported at a housing 3 by a ball bearing (first bearing) 21. A calk ring 22 is calked to be mounted to a ring-like groove 13 at an upper end of the large diameter shaft portion 11. An inner ring of the ball bearing 21 is squeezed between the calk ring 22 and an upper end face 41 of the pinion 4.

Further, an outer ring of the ball bearing 21 is inserted to a bearing hole 31 which is configured at the housing 3 and is fixed to the housing 3 unmovably in an axial direction by a snap ring 23 which is mounted to a ring-like groove 32 on a side of an opening of the bearing hole 31.

At a gear tooth root 43 on a side of the upper end face 41 (large diameter shaft portion) of the pinion 4, there is configured a raised portion (first raised portion) 44 (a relief portion of a hob cutter in machining a tooth shape of the pinion 4) having a radius R1 the same as a radius of curvature of the hob cutter on a side downward from the upper end face 41. Further, at the gear tooth root 43 on a side of a lower end face 42 (small diameter shaft portion 12) of the pinion 4, there is configured a raised portion (second raised portion) 45 having the radius R1 the same as the radius of curvature of the hob cutter on an upper side of the lower end face 42. Therefore, distal ends of the raised portions 44 and 45 are configured by a diameter the same as a gear tooth tip circle diameter D2 of the pinion 4.

A dimension of an outer diameter of the small diameter shaft portion 12 is configured to be smaller than the gear tooth root circle diameter D1 of the pinion 4. The small diameter shaft portion 12 is axially supported by a needle bearing (second bearing) 24 at a bearing hole 33 which is formed on a lower side of the housing 3. In this way, the pinion shaft 1 is supported at the housing 3 in a thrust direction and in a radial direction by the ball bearing 21 and the needle bearing 24.

An upper end of the pinion shaft 1 is connected to the steering wheel 101 by way of the universal joint 109B and the middle shaft 106 of FIG. 1. When the steering wheel 101 is manipulated, the pinion shaft 1 is transmitted with a steering force which is added with a steering assist force of the motor 102. Rotation of the pinion shaft 1 is transmitted to the rack 5 by way of the pinion 4, and changes a direction of a steered wheel by way of the tie rod 104 of FIG. 1 which is connected to the rack 5. Teeth of the pinion 4 are configured by those of a helical pinion having a predetermined angle of torsion relative to an axial center of the pinion shaft 1 in order to smoothly transmit rotation of the pinion 4 to the rack 5.

A rack guide 6 always presses a press block 61 to a back face of the rack 5 by an adjust cover 62. The adjust cover 62 presses the press block 61 to the back face of the rack 5 by urging the press block 61 by way of a coil spring 63. Thereby, there is eliminated a backlash of a portion at which the pinion 4 and the rack 5 are brought in mesh with each other to thereby smoothly move the rack 5.

Figure 12:
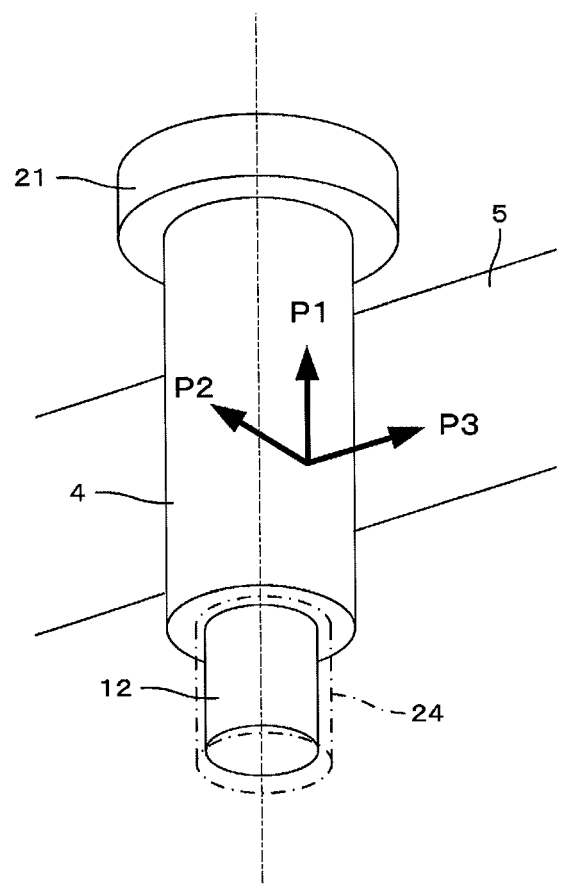
FIG. 12 is a perspective view showing a load which is applied to the pinion shaft of FIG. 10.

As shown by FIG. 12, when a steering force of the steering wheel 101 is transmitted to the rack 5, a large thrust load P1 is applied to the pinion 4, and the snap ring 23 is detached or broken, the pinion shaft 1 is moved to upper sides in axial directions of FIG. 1 and FIG. 2. Then, the raised portion 45 on the side of the lower end face 42 of the pinion 4 is brought into contact with an outer peripheral face 51 of the rack 5 and the pinion shaft 1 does not move further in the axial direction. Therefore, the thrust load can be supported thereby and a predetermined performance of the rack and pinion steering device can be maintained. Further, when the raised portion 45 is brought into contact with the outer peripheral face 51 of the rack 5, strange sound is emitted. Therefore, a driver can be informed of an abnormality.

According to the first embodiment of the present invention, only the raised portion 45 is configured at the gear tooth root 43 on the side of the small diameter shaft portion 12 of the pinion 4 and the distal end of the raised portion 45 is only configured by the diameter the same as the gear tooth tip circle diameter D2 of the pinion 4. Therefore, an increase in the manufacturing cost can be restrained to be small.

Second Embodiment

Figure 4:
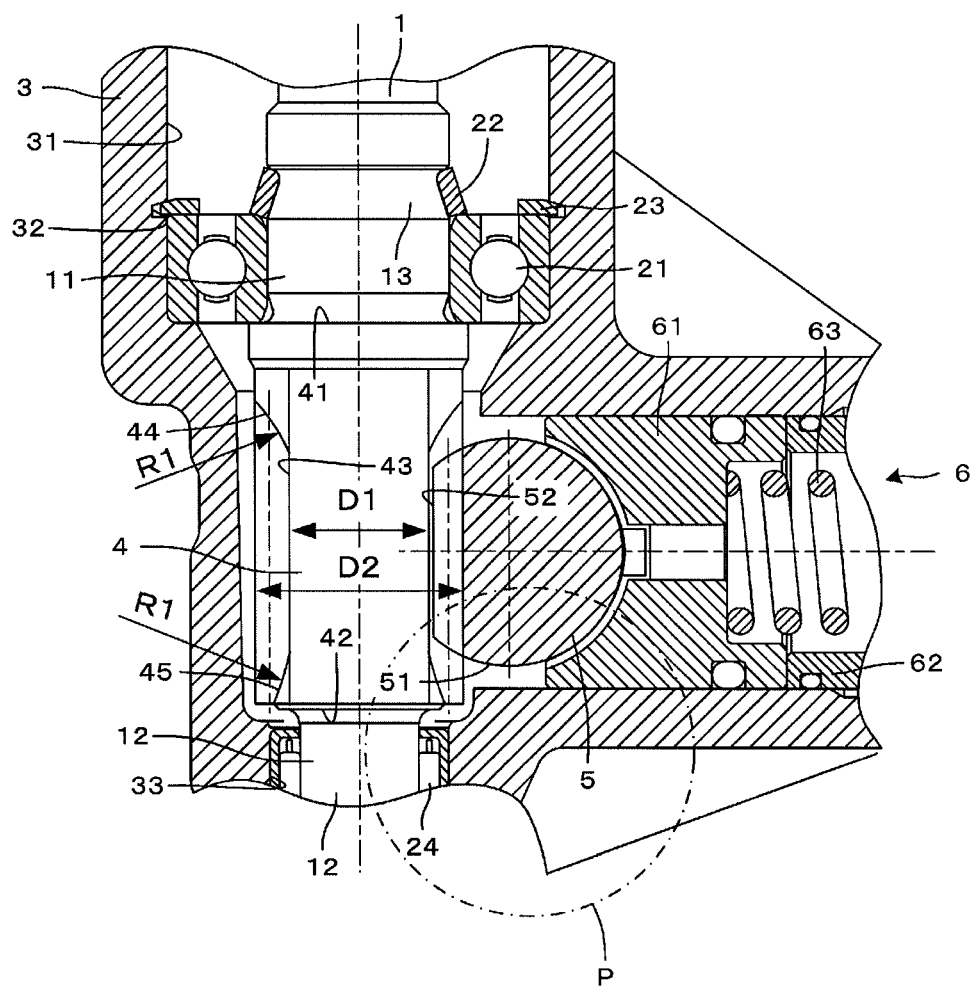
FIG. 4 is a vertical sectional view showing a rack and pinion steering device according to a second embodiment of the present invention.
Figure 5:
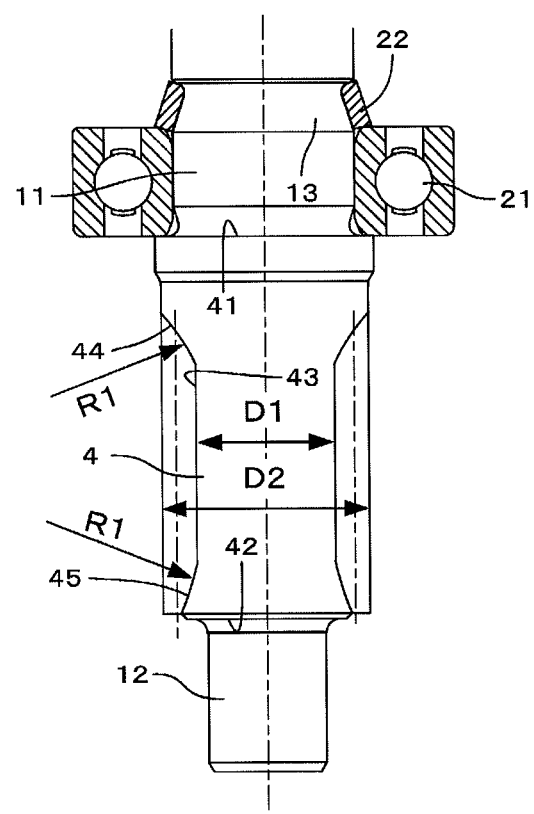
FIG. 5 is a front view of a pinion shaft of FIG. 4.
Figure 6:
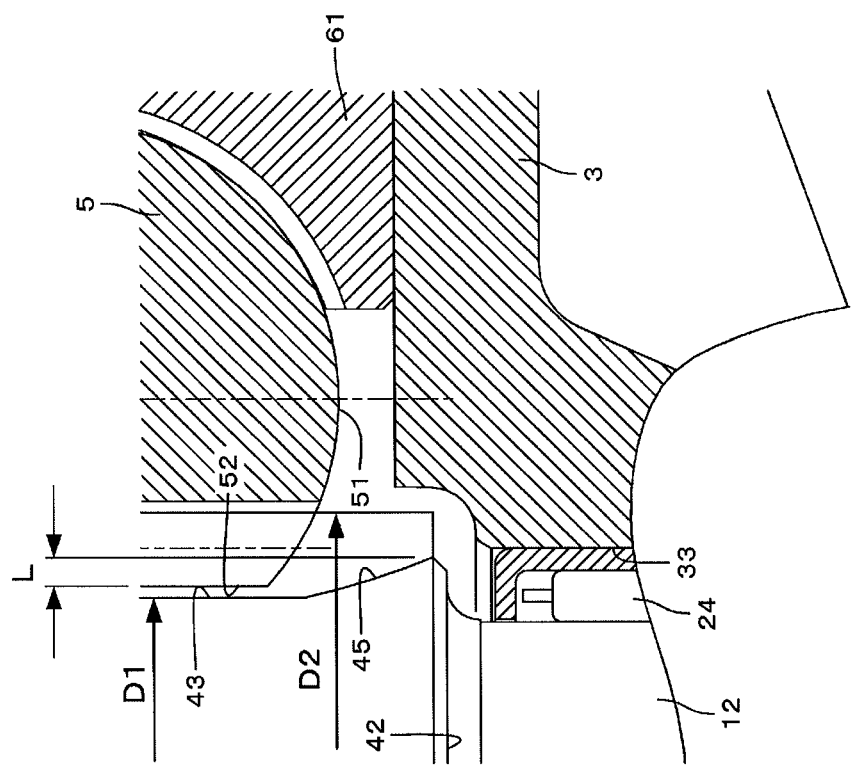
FIG. 6 is a sectional view enlarging portion P of FIG. 4.

Next, an explanation will be given of a second embodiment of the present invention. FIG. 4 is a vertical sectional view showing a rack and pinion steering device according to a second embodiment of the present invention, FIG. 5 is a front view of a pinion shaft of FIG. 4, and FIG. 6 is a sectional view enlarging portion P of FIG. 4. In the following explanation, an explanation will be given only of a portion of a structure which differs from that of the embodiment described above, and a duplicated explanation will be omitted. Further, an explanation will be given by attaching the same numeral to the same part. The second embodiment is a modified example of the first embodiment and is an example in which the diameter of the distal end of the raised portion 45 of the first embodiment is configured to be smaller than that of the first embodiment.

As shown in FIG. 4 through FIG. 6, the pinion shaft 1 is configured with the pinion 4 downward from substantially the middle position in the axial direction, and the upper end of the pinion 4 is configured with the large diameter shaft portion 11 the diameter of which is larger than the gear tooth root circle diameter D1 of the pinion 4. Further, the lower end of the pinion 4 is configured with the small diameter shaft portion 12 the diameter of which is smaller than the gear tooth root circle diameter D1 of the pinion 4.

The large diameter shaft portion 11 is axially supported at the housing 3 by the ball bearing (first bearing) 21. The calk ring 22 is calked to be mounted to the ring-like groove 13 at the upper end of the large diameter shaft portion 11. The inner ring of the ball bearing 21 is squeezed between the calk ring 22 and the upper end face 41 of the pinion 4.

Further, the outer ring of the ball bearing 21 is inserted to the bearing hole 31 which is configured at the housing 3, and is fixed to the housing 3 unmovably in the axial direction by the snap ring 23 which is mounted to the ring-like groove 32 on the side of the opening of the bearing hole 31.

At the gear tooth root 43 on the side of the upper end face 41 (large diameter shaft portion 11) of the pinion 4, there is configured the raised portion (first raised portion) 44 (relief portion of a hob cutter in machining the tooth shape of the pinion 4) having the radius R1 the same as the radius of curvature of the hob cutter downward from the upper end face 41. The distal end of the raised portion 44 is configured by the diameter the same as the gear tooth tip circle diameter D2 of the pinion 4.

Further, at the gear tooth root 43 on the side of the lower end face 42 (small diameter shaft portion 12) of the pinion 4, there is configured the raised portion (second raised portion) 45 having the radius R1 the same as that of the radius of curvature of the hob cutter to extend upward from the lower end face 42. A diameter of the distal end of the raised portion 45 is configured to be smaller than the gear tooth tip circle diameter D2 of the pinion 4 and larger than a diameter of a gear tooth tip 52 of the rack 5 by a length L of FIG. 6.

The dimension of the outer diameter of the small diameter shaft portion 12 is configured to be smaller than the gear tooth root circle diameter D1 of the pinion 4. The small diameter shaft portion 12 is axially supported by the needle bearing (second bearing) 24 at the bearing hole 33 which is formed on the lower side of the housing 3. In this way, the pinion shaft 1 is supported by the housing 3 in the thrust direction and in the radial direction by the ball bearing 21 and the needle bearing 24.

The upper end of the pinion shaft 1 is connected to the steering wheel 101 by way of the universal joint 101B and the middle shaft 106 of FIG. 1. When the steering wheel 101 is manipulated, the pinion shaft 1 is transmitted with the steering force which is added with a steering assist force of the motor 102. Rotation of the pinion shaft 1 is transmitted to the rack 5 by way of the pinion 4, and changes the direction of the steered wheel by way of the tie rod 104 of FIG. 1 which is connected to the rack 5. In order to smoothly transmit rotation of the pinion 4 to the rack 5, teeth of the pinion 4 are formed by those of the helical pinion having the predetermined angle of torsion relative to the axial center of the pinion shaft 1.

The rack guide 6 always presses the press block 61 to the back face of the rack 5 by the adjust cover 62. The adjust cover 62 presses the press block 61 to the back face of the rack 5 by urging the press block 61 by way of the coil spring 63. Thereby, there is eliminated the backlash of the portion at which the pinion 4 and the rack 5 are brought in mesh with each other to thereby smoothly move the rack 5.

As shown by FIG. 12, when the steering force of the steering wheel 101 is transmitted to the rack 5, the large thrust load P1 is applied to the pinion 4, and the snap ring 23 is detached or broken, the pinion shaft 1 is moved to upper sides in the axial directions of FIG. 4 through FIG. 6. Then, the raised portion 45 on the side of the lower end face 42 of the pinion 4 is brought into contact with the outer peripheral face 51 of the rack 5, and the pinion shaft 1 does not move further in the axial direction. Therefore, the thrust load can be supported, and a predetermined performance of the rack and pinion steering device can be maintained. Further, when the raised portion 45 is brought into contact with the outer peripheral face 51 of the rack 5, strange sound is emitted. Therefore, a driver can be informed of an abnormality.

According to the second embodiment of the present invention, only the raised portion 45 is configured at the gear tooth root 43 on the side of the small diameter shaft portion 12 of the pinion 4, and only the diameter of the distal end of the raised portion 45 is configured to be smaller than the gear tooth tip circle diameter D2 of the pinion 4 and larger than the diameter of the gear tooth tip 52 of the rack 5. Therefore, the increase in the manufacturing cost can be restrained to be small.

Third Embodiment

Figure 7:
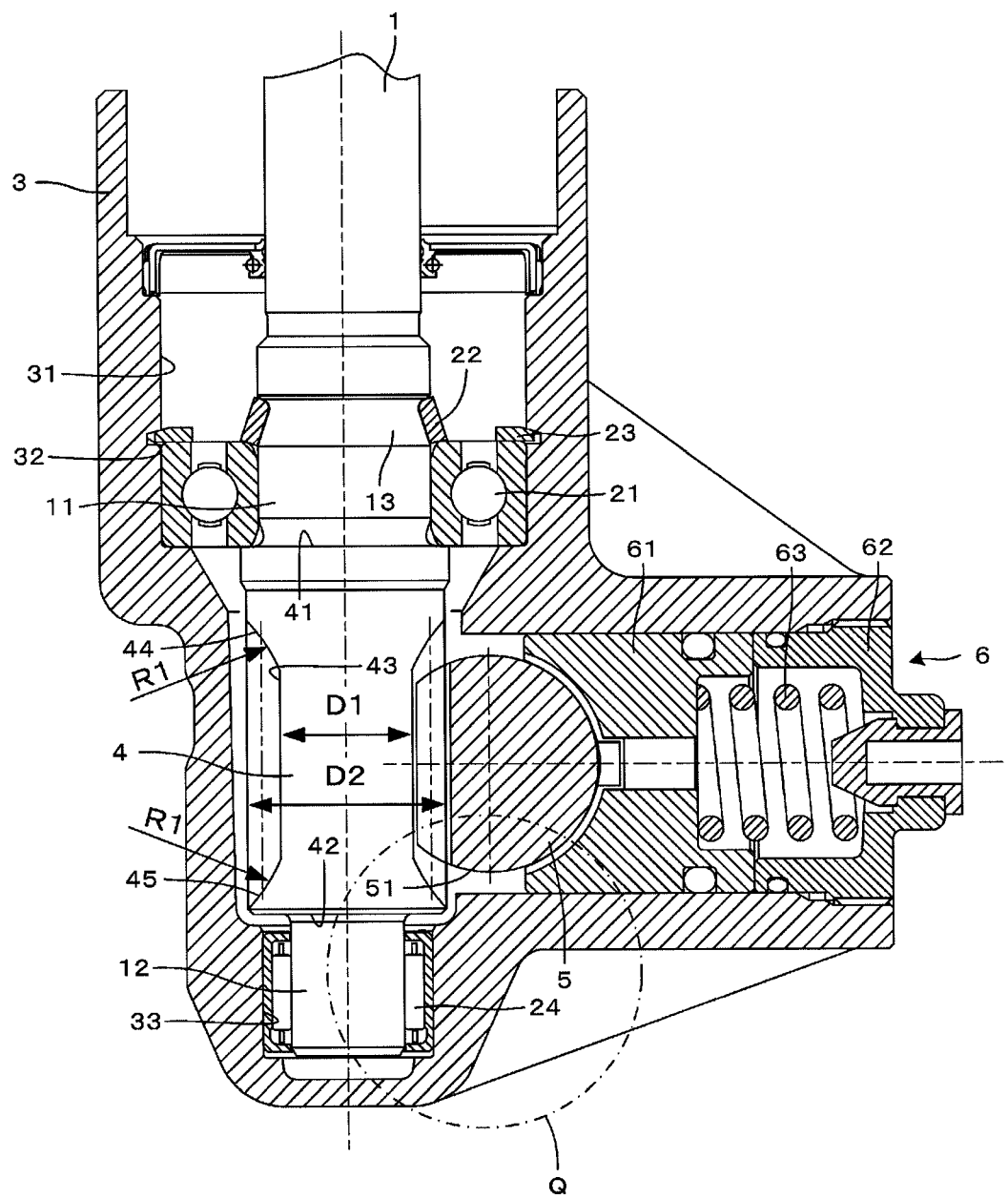
FIG. 7 is a vertical sectional view showing a rack and pinion steering device according to a third embodiment of the present invention.
Figure 8:
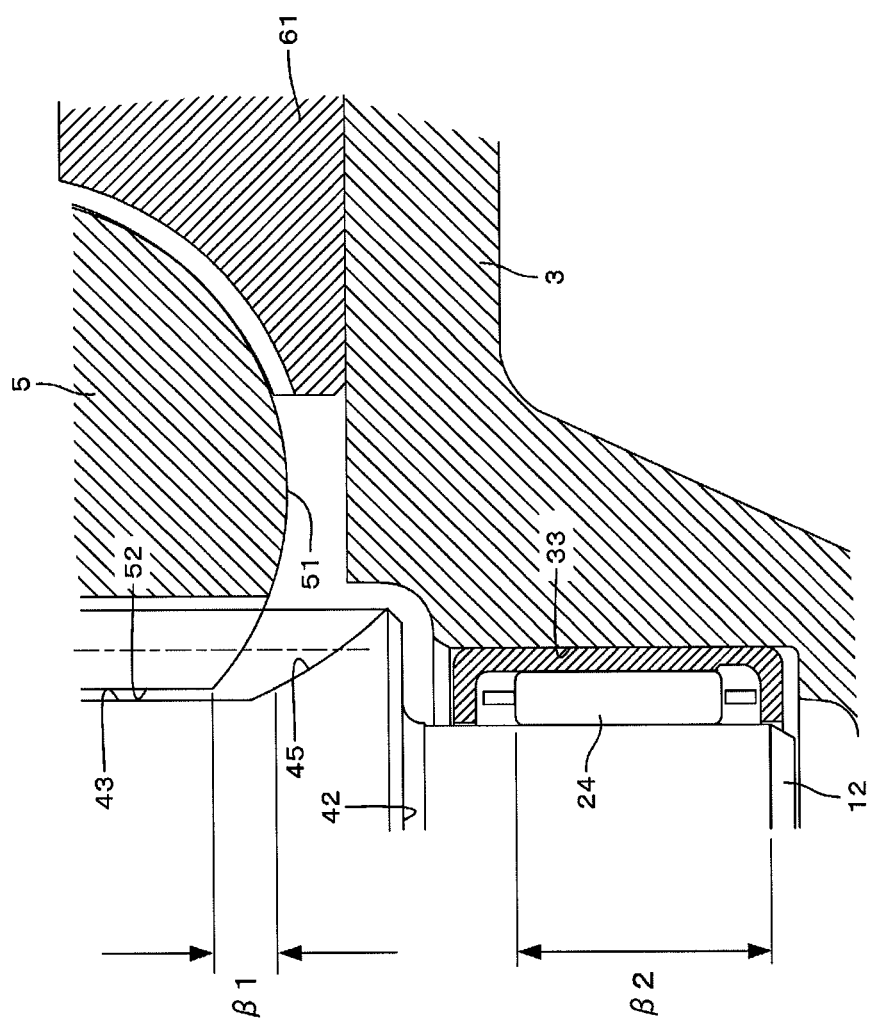
FIG. 8 is a sectional view enlarging portion Q of FIG. 7.
Figure 9:
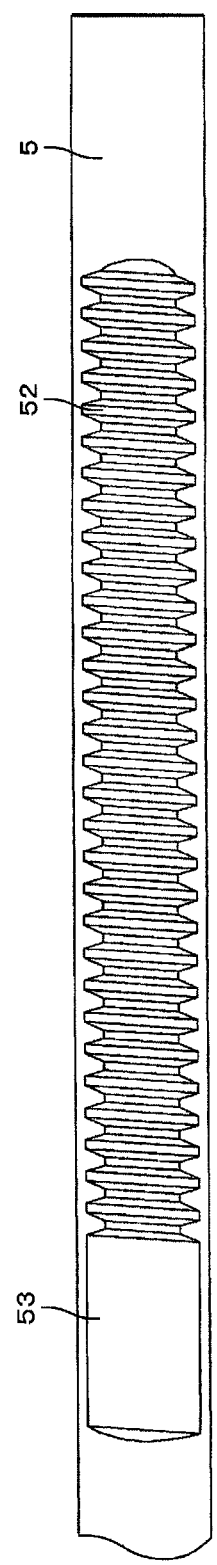
FIG. 9 is a front view of a single body of a rack of FIG. 7.
Figure 10:
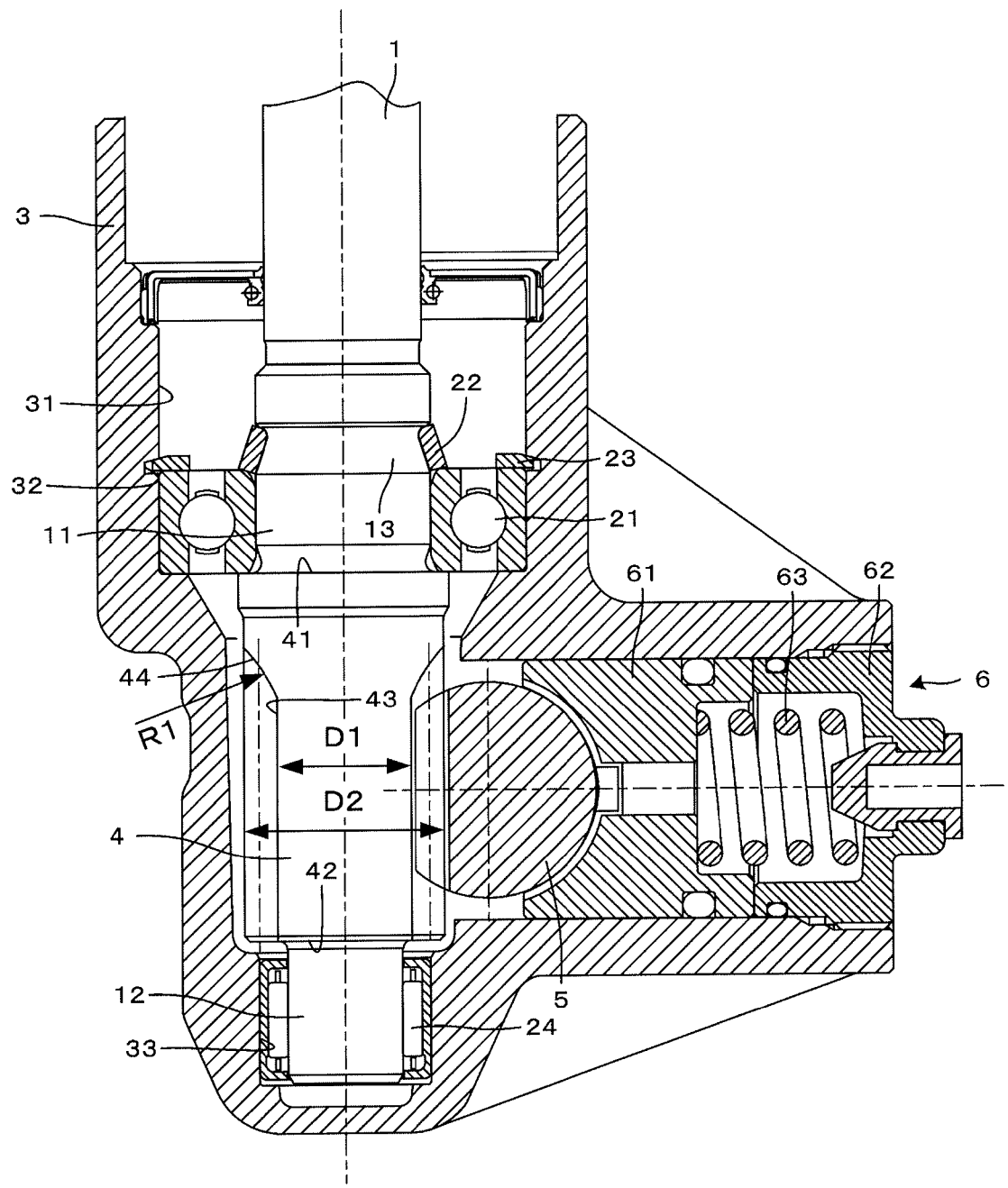
FIG. 10 is a perspective view showing a total of a rack and pinion steering device according to a related art.
Figure 11:
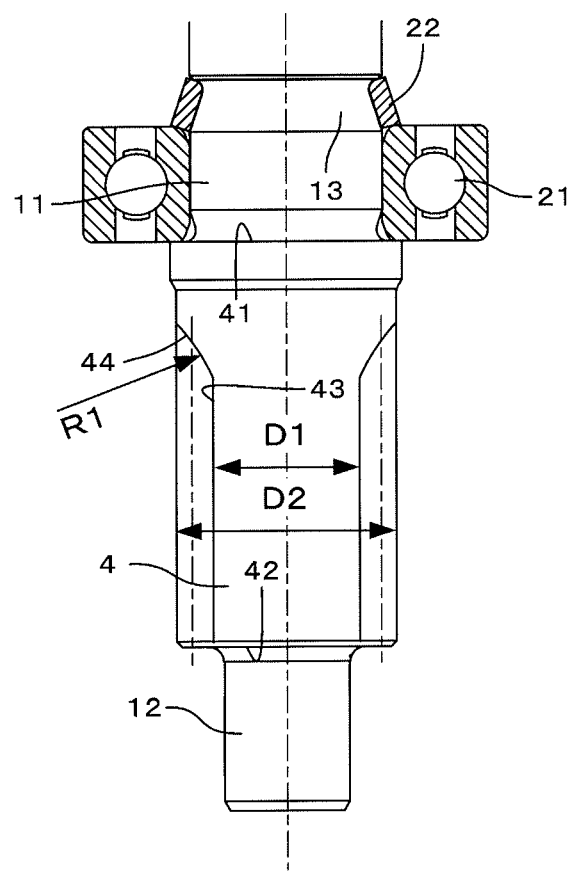
FIG. 11 is a front view of a pinion shaft of FIG. 10.

Next, an explanation will be given of a third embodiment of the present invention. FIG. 7 is a vertical sectional view showing a rack and pinion steering device according to a third embodiment of the present invention, FIG. 8 is a sectional view enlarging portion Q of FIG. 7, and FIG. 9 is a front view of a single body of a rack of FIG. 7. In the following explanation, an explanation will be given only of a portion of a structure which differs from those of the above-described embodiments, and a duplicated explanation will be omitted. Further, an explanation will be given by attaching the same numeral to the same part. The third embodiment is a modified example of the first embodiment, and is an example in which the small diameter shaft portion is prevented from being detached from the second bearing when the pinion shaft is moved to the side of the first bearing by a thrust load applied to the pinion.

As shown by FIG. 7 and FIG. 8, the pinion shaft 1 is configured with the pinion 4 downward from substantially the middle position in the axial direction, and the upper end of the pinion 4 is configured with the large diameter shaft portion 11 having the diameter larger than the gear tooth root circle diameter D1 of the pinion 4. Further, the lower end of the pinion 4 is configured with the small diameter shaft portion 12 having the diameter smaller than the gear tooth root circle diameter D1 of the pinion 4.

The large diameter shaft portion 11 is axially supported at the housing 3 by the ball bearing (first bearing) 21. The calk ring 22 is calked to be mounted to the ring-like groove 13 at the upper end of the shaft portion of the large diameter shaft portion 11. The inner ring of the ball bearing 21 is squeezed between the calk ring 22 and the upper end face 41 of the pinion 4.

Further, the outer ring of the ball bearing 21 is inserted to the bearing hole 31 which is configured at the housing 3, and is fixed to the housing 3 unmovably in the axial direction by the snap ring 23 which is mounted to the ring-like groove 32 on the side of the opening of the bearing hole 31.

At the gear tooth root 43 on the side of the upper end face 41 (large diameter shaft portion 11) of the pinion 4, there is configured the raised portion (first raised portion) 44 (the relief portion of the hob cutter in machining the tooth shape of the pinion 4) of the radius R1 the same as the radius of curvature of the hob cutter downward from the upper end face 41.

Further, at the gear tooth root 43 on the side of the lower end face 42 (small diameter shaft portion 12) of the pinion 4, there is configured the raised portion (second raised portion) 45 having the radius R1 the same as the radius of curvature of the hob cutter upward from the lower end face 42. Therefore, the diameters of the distal ends of the raised portions 44 and 45 are configured by the diameters the same as the gear tooth tip circle diameter D2 of the pinion 4. As shown by FIG. 9, a flat face portion 53 is configured by extending a gear tooth root of a rack tooth at a left end portion of the rack teeth of the rack 5. A position in an axial direction of the rack 5 is positioned such that the flat face portion 53 comes to an axial center position of the pinion shaft 1, and thereafter, the pinion shaft 1 is inserted to the housing 3 to assemble.

The dimension of the outer diameter of the small diameter shaft portion 12 is configured to be smaller than the gear tooth root circle diameter D1 of the pinion 4. The small diameter shaft portion 12 is axially supported by the needle bearing (second bearing) 24 at the bearing hole 33 which is configured on the lower side of the housing 3. In this way, the pinion shaft 1 is supported at the housing 3 in the thrust direction and in the radial direction by the ball bearing 21 and the needle bearing 24.

The upper end of the pinion shaft 1 is connected to the steering wheel 101 by way of the universal joint 109B and the middle shaft 106 of FIG. 1. When the steering wheel 1 is manipulated, the pinion shaft 1 is transmitted with the steering force which is added with the steering assist force of the motor 2. Rotation of the pinion shaft 1 is transmitted to the rack 5 by way of the pinion 4, and changes the direction of the steered wheel by way of the tie rod 104 of FIG. 1 which is connected to the rack 5. Teeth of the pinion 4 are configured by those of the helical pinion which has the predetermined angle of torsion relative to the axial center of the pinion shaft 1 in order to smoothly transmit rotation of the pinion 4 to the rack 5.

The rack guide 6 always presses the press block 61 to the back face of the rack 5 by the adjust cover 62. The adjust cover 62 presses the press block 61 to the back face of the rack 5 by urging the press block 61 by way of the coil spring. Thereby, there is eliminated the backlash of the portion at which the pinion 4 and the rack 5 are brought in mesh with each other to thereby smoothly move the rack 5.

As shown by FIG. 12, when the steering force of the steering wheel 101 is transmitted to the rack 5, the large thrust load P1 is applied to the pinion 4, and the snap ring 23 is detached or broken, the pinion shaft 1 is moved to upper sides in the axial directions of FIG. 7 and FIG. 8. Then, the raised portion 45 on the side of the lower end face 42 of the pinion 4 is brought into contact with the outer peripheral face 51 of the rack 5, and the pinion shaft 1 does not move further in the axial direction. Further, when the raised portion 44 is brought into contact with the outer peripheral face 51 of the rack 5, strange sound is emitted. Therefore, a driver is informed of an abnormality.

As shown by FIG. 8, notation β1 designates a length in an axial direction until the outer peripheral face 51 of the rack 5 is brought into contact with the raised portion 45 on the side of the lower end face 42 of the pinion 4. Further, notation β2 designates a length in an axial direction by which the needle bearing 24 axially supports the small diameter shaft portion 12. β1 is configured to be smaller than β2. Therefore, even when the pinion shaft 1 is moved to the upper side in the axial direction, the small diameter shaft portion 12 is not detached from the needle bearing 24. Therefore, the pinion shaft 1 is always axially supported by both of the ball bearing 21 and the needle bearing 24. Therefore, the predetermined performance of the rack and pinion steering device can be maintained.

What is claimed is:

1. A rack and pinion steering device comprising:
    a housing;
    a pinion shaft which is axially supported rotatably by the housing, and to one end of which a steering force of a steering wheel is transmitted;
    a pinion which is configured at another end of the pinion shaft;
    a rack which is brought in mesh with the pinion for transmitting the steering force to a side of a wheel;
    a large diameter shaft portion which is configured at one end of the pinion with a diameter thereof larger than a gear tooth root circle diameter of the pinion;
    a first bearing which is a ball bearing for axially supporting the large diameter shaft portion rotatably at the housing, the outer ring of the first bearing being inserted into a bearing hole and being fixed to the housing unmovably in an axial direction by a snap ring which is mounted to a ring-like groove on a side of an opening of the bearing hole;
    a small diameter shaft portion which is configured at another end of the pinion with a diameter thereof smaller than the gear tooth root circle diameter of the pinion;
    a second bearing which is a needle bearing for supporting the small diameter shaft portion rotatably at the housing;
    a first raised portion which is configured at a gear tooth root of the pinion on a side of the large diameter shaft portion; and
    a second raised portion which is configured at the gear tooth root of the pinion on a side of the small diameter shaft portion, wherein
        a distal end of the first raised portion is configured by a diameter the same as a gear tooth tip circle diameter of the pinion,
        a distal end of the second raised portion is configured by a diameter smaller than the gear tooth tip circle diameter of the pinion,
        the second raised portion has a radius larger than a radial distance from the axis of the pinion to a rack tooth,
        the pinion shaft is moved to a side of the first bearing by a thrust load applied to the pinion,
        a length in an axial direction until an outer peripheral face of the rack is brought into contact with the second raised portion is configured to be smaller than a length in the axial direction by which the second bearing supports the small diameter shaft portion, and
        the snap ring is located upstream of the first bearing, along a torque direction of the steering device.

* * * * *